2,750,406

1,2,3,4,4a,9,10,10a- OCTAHYDRO -7- HYDROXY-1,4a-DIMETHYL-9- OXO-1-PHENANTHRENECARBOX-YLIC ACID AND ESTERS THEREOF

Paul F. Ritchie, Wilmington, Del., assignor to Hercules Powder Company, Wilmington, Del., a corporation of Delaware No Drawing. Application March 24, 1953,
Serial No. 344,471

8 Claims. (Cl. 260—473)

This invention relates to a new ketophenolic derivative of phenanthrene obtainable from dehydroabietic acid and, more particularly, to octahydro-7-hydroxy-1,4a-dimethyl-9-oxo-1-phenanthrenecarboxylic acid, the esters thereof, and their preparation.

In accordance with this invention, it has been found that the isopropyl radical of the dehydroabietic acid nucleus of 9-oxodehydroabietic acid esters may be replaced by a hydroxyl radical to produce a phenanthrenecarboxylic acid ester containing both a keto group and a phenolic group by oxidizing an ester of 9-oxodehydroabietic acid to the 14-hydroperoxy-9-oxodehydroabietate and then cleaving this tertiary hydroperoxide with acid whereby acetone is produced and a hydroxyl radical replaces the isopropyl group. The free acid may then be produced by the saponification of these esters. The new 1,2,3,4,4a,9,10,10a - octahydro-7-hydroxy-1,4a-dimethyl-9-oxo-1-phenanthrenecarboxylic acid and esters thereof produced in accordance with this invention have the following structural formula:

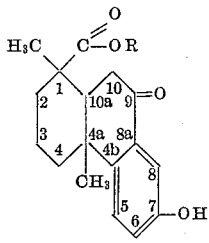

where R is any alkyl, hydroxyalkyl, aryl, or aralkyl radical. Thus, these new compounds contain in addition to the keto and ester groups a phenolic hydroxyl radical.

The following examples will illustrate the preparation of these new ketohydroxy phenanthrenecarboxylic acid esters and the free acid therefrom in accordance with this invention. All parts are by weight unless otherwise indicated.

*Example 1*

Five parts of the methyl ester of 9-oxodehydroabietic acid was oxidized with molecular oxygen at 91.5° C. in the presence of 0.093 part of benzoyl peroxide by passing oxygen through the molten mixture at the rate of 600 ml./min., the oxygen pressure being maintained constant at atmospheric pressure by the use of an automatic pressure compensator. After 45 hours, the ester had absorbed 51 mole per cent of oxygen and on analysis the product was found to contain 44 mole per cent of hydroperoxide. The hydroperoxide so produced was the methyl ester of 14-hydroperoxy-9-oxodehydroabietic acid.

A portion of the above oxidate was placed in a cell provided with a gas inlet tube near the bottom and an exit tube near the top, the latter being connected in series with traps containing an aqueous solution of 2,4-dinitrophenylhydrazine hydrochloride. p-Toluenesulfonic acid was added to the reaction cell, the reaction mixture was heated to 70° C., and nitrogen was passed through the reaction mixture. An orange-yellow precipitate immediately formed. This precipitate was collected and dried at 100° C. It had a melting point of 122°–126° C. and on recrystallization from ethanol, the melting point was 124.5°–126° C. That acetone had been evolved and the 2,4-dinitrophenylhydrazone formed was proved by the fact that on admixture of this recrystallized material with an authentic sample of the 2,4-dinitrophenylhydrazone of acetone, there was no depression in the melting point. The residual solid material remaining in the reaction cell was dissolved in ether and the solution was washed with water until free of acid, and then extracted with a 2% aqueous potassium hydroxide solution. The alkaline extract was neutralized with dilute hydrochloric acid and the organic material was extracted with ether. After washing and drying the ethereal solution, the solvent was removed by evaporation. The residue was then crystallized from aqueous acetone and on recrystallization from this solvent, fine white needles were obtained which had a melting point of 196°–197° C. This crystalline product was soluble in 2% alkali but insoluble in 5% bicarbonate solution. Elementary analysis of this product showed it to be in agreement with that of the methyl ester of octahydro-7-hydroxy-1,4a-dimethyl-9-oxo-1-phenanthrenecarboxylic acid ($C_{18}H_{22}O_4$).

*Example 2*

Ten parts of methyl 9-oxodehydroabietate was oxidized with molecular oxygen as in the foregoing example except that 0.186 part of benzoyl peroxide was used and the oxidation was carried out at 99.3° C. After 45 hours, the ketone had absorbed 80.3 mole per cent of oxygen and contained 52 mole per cent of hydroperoxide. This oxidate was subjected to countercurrent extraction by dissolving it in 100 parts of methanol containing 20% of water, which solution was then equilibrated against an equal volume of hexane. The aqueous methanol layer was separated and an equal volume of hexane added to it. To the hexane solution in the first separator was added a fresh portion of 100 parts of 20% aqueous methanol. The solutions were again equilibrated and the layers transferred, fresh portions of solvent added, and the solutions equilibrated as before. This procedure was continued until 5 separators were in use and the total volume of each solvent phase was equal to about 500 parts (15 equilibrations). The end fractions were then dropped off, collected, and transfers were made as before until all 5 aqueous methanol layers had been collected together and all 5 hexane layers had been similarly combined. The hexane solution was washed with water and the solvent removed by distillation at room temperature under reduced pressure whereby 2.96 parts of the oxidate was obtained which on analysis was shown to contain 4% of hydroperoxide. The aqueous methanol layers were poured into several volumes of water and the hydroperoxidic material was extracted with ether. After drying the ethereal solution and removing the solvent, a fraction was obtained which amounted to 7.12 parts and contained 67% of hydroperoxide.

One-half of this hydroperoxide-rich fraction was dissolved in 50 parts of methanol containing 0.95 part of p-toluenesulfonic acid monohydrate and the reaction mixture was heated under reflux for 1.5 hours. It was then poured into several volumes of water and extracted with ether. The ethereal solution was washed with water and extracted successively with 5% aqueous bicarbonate and 2% aqueous sodium hydroxide solutions. The alkali-soluble fraction which was so recovered was crystallized from aqueous acetic acid to obtain a crude crystalline product melting at 189°–193° C. On recrystallization, the product had a melting point of 193°–195° C.

Example 3

Ten parts of methyl 9-oxodehydroabietate was oxidized with molecular oxygen at 90.0° C. in the presence of 0.500 part of benzoyl peroxide. After 29 hours, the ketone had absorbed 60.7 mole per cent oxygen and contained 49.2 mole per cent of hydroperoxide. A portion of this oxidate (9.5 parts) was dissolved in 30 parts of glacial acetic acid. To this solution was added a solution of one part of 70% perchloric acid in 20 parts of acetic acid. After 0.5 hour, the reaction mixture was poured into 200 parts of water and the product was extracted with ether. The ethereal solution was washed with water and 5% aqueous sodium bicarbonate before extracting with 2% potassium hydroxide solution under an atmosphere of nitrogen. The alkali-soluble fraction was recovered by acidification and extraction with ether. After washing with 5% aqueous sodium bicarbonate solution, the ethereal solution was dried in contact with anhydrous sodium sulfate and the solvent was then removed by evaporation. The material so obtained was crystallized from aqueous acetic acid to obtain 2.80 parts of the ketophenol having a melting point of 195°–197° C. The neutral fraction, i. e., the fraction insoluble in bicarbonate and alkali, was absorbed on an alumina column and the column eluted with benzene whereby 3.37 parts of crystalline methyl 9-oxodehydroabietate was recovered.

Example 4

Five parts of crystalline methyl ester of octahydro-7-hydroxy-1,4a-dimethyl-9-oxo-1-phenanthrenecarboxylic acid, prepared as described in the foregoing experiments, was dissolved in 200 parts of diethylene glycol in which had been dissolved 6 parts of potassium hydroxide and 30 parts of water. The solution was boiled for 3 hours under an atmosphere of nitrogen. After cooling, the solution was poured into 1000 parts of water and the product was extracted with ether. The ethereal solution was washed until neutral and the product was recovered by evaporation of the dry ether solution. The crystalline acid (5 parts) so obtained was recrystallized from aqueous acetone and from an acetone-benzene mixture to obtain 3.5 parts of white needles having a melting point of 267°–269° C. The neutral equivalent was determined and found to be 290 (the calculated value for the free acid is 288). The elementary analysis of this product (carbon 71.11%; hydrogen 7.19%) showed it to be in agreement with that of octahydro-7-hydroxy-1,4a-dimethyl-9-oxo-1-phenanthrenecarboxylic acid ($C_{17}H_{20}O_4$).

The new esters of 1,2,3,4,4a,9,10,10a-octahydro-7-hydroxy-1,4a-dimethyl-9-oxo-1-phenanthrenecarboxylic acid are prepared by the acid cleavage of the corresponding ester of 14-hydroperoxy-9-oxodehydroabietic acid. While the foregoing examples have shown the preparation of the methyl ester of this phenanthrenecarboxylic acid, any alkyl, hydroxyalkyl, aryl, or aralkyl ester may be prepared, as, for example, ethyl, propyl, butyl, hydroxyethyl, glycerol, benzyl, etc.

The esters of 14-hydroperoxy-9-oxodehydroabietic acid, from which the new ketophenol phenanthrenecarboxylic acids are prepared in accordance with this invention, are obtained by the oxidation of esters of 9-oxodehydroabietic acid. The latter esters may be prepared in a variety of ways. The alkali metal salts of dehydroabietic acid or a commercial dehydrogenated or disproportionated rosin may be oxidized by contacting an aqueous solution of a water-soluble persulfate and said rosin salt with oxygen and then esterifying the alkali salt of 9-oxodehydroabietic acid so obtained. They may also be prepared by oxidizing an ester of dehydrogenated rosin or a dehydrogenated rosin ester or the ester of pure dehydroabietic acid in liquid phase, i. e., molten or in solution in an inert solvent, with oxygen in the presence of a free radical oxidation initiator such as benzoyl peroxide and then reducing the ester of 9-hydroperoxydehydroabietic acid so produced with a metallic reducing agent such as ferrous sulfate.

The oxidation of the esters of 9-oxodehydroabietic acid to the 14-hydroperoxydehydroabietate is carried out by contacting the ester in liquid phase, i. e., either in the molten state or dissolved in an inert solvent, with a gas containing free oxygen. While the reaction may be carried out in the absence of an initiator, it is more rapidly carried out in the presence of a free radical oxidation initiator, as, for example, peroxidic materials such as persulfates, organic peroxides and organic hydroperoxides which form free radicals under the reaction conditions. Examples of such initiators which may be used are the acyl peroxides such as acetyl peroxide, benzoyl peroxide, etc., alkyl peroxides such as tert-butyl peroxide, alkyl hydroperoxides such as tert-butyl hydroperoxide, and alkyl aryl and alkyl cycloalkyl hydroperoxides such as diphenylmethyl hydroperoxide, α,α-dimethylbenzyl hydroperoxide, methylcyclohexyl hydroperoxide, naphthene hydroperoxides, etc. The amount of the initiator added may vary over a wide range but in general is from about 0.1% to about 20%, and preferably from about 0.3% to about 10%, of the weight of the ester being oxidized.

Any gas containing free oxygen may be used for carrying out the oxidation, as, for example, pure oxygen, air, or any other mixture of oxygen and an inert gas. If the oxidation is carried out in the absence of a solvent, the temperature at which the oxidation is carried out should be at least that of the melting point of the ester being oxidized, as, for example, 68° C. in the case of methyl 9-oxodehydroabietic acid. Lower temperatures may be used if a solution of the ester is oxidized. In general, the oxidation is carried out at a temperature of from about 60° C. to about 130° C., preferably from about 70° C. to about 100° C.

The oxidate produced by the oxidation of esters of 9-oxodehydroabietic acid as described above may be treated directly to produce the new products of this invention or it may be first concentrated to obtain a hydroperoxide-rich fraction, by means of countercurrent extraction with two immiscible solvents. On the other hand, the pure esters of 14-hydroperoxy-9-oxodehydroabietic acid may be used but since these pure hydroperoxides are isolated only with difficulty, it is more practical to use the oxidate directly or a hydroperoxide-rich fraction thereof.

The cleavage of these tertiary hydroperoxides, the esters of 14-hydroperoxy-9-oxodehydroabietic acid, is carried out by contacting the hydroperoxide with an acid catalyst. Catalysts capable of decomposing this hydroperoxide group to acetone and the corresponding phenol are those materials which act like acids, as, for example, those catalysts generally classified as the acidic condensation catalysts such as strong acids, acid clays, Friedel-Crafts catalysts, cracking catalysts, various phosphorus chlorides, etc. Exemplary of the acid catalysts which may be used are such acids as sulfuric acid, perchloric acid, hydrogen halides, sulfonic acids such as benzenesulfonic acid, p-toluenesulfonic acid, sulfonated phenolformaldehyde polymers, and other organic acids such as trichloroacetic acid and other haloacetic acids, picric acid, nitroacetic acid, etc.; acid clays such as montmorillonite, kaolinite, vermiculite, silica gel, kaolin, fuller's earth, etc.; cracking catalysts such as phosphoric acid-on-alumina; anhydrous ferric chloride, boron trifluoride, phosphorus trichloride, phosphorus pentachloride, phosphorus oxychloride, etc. Even such weak acid catalysts as acetic acid may be used if the reaction is carried out at an elevated temperature. The acid catalyst acts as a true catalyst for the reaction and, consequently, only a catalytic amount is required. Larger amounts may be used if desired, as, for example, from about 1 to about 5%. The cleavage reaction may be carried out either in the presence or absence of a solvent for the hydroperoxide. Solvents which may be used are alcohols, ethers, esters, liquid hydrocarbons, chlorinated hydrocarbons, etc., such as methanol, ethanol, isopropanol, diethyl ether, methyl acetate, chloroform, carbon tetrachloride, dioxane, acetic acid, hexane, benzene, toluene, etc.

The temperature at which the cleavage of the hydroperoxide to the phenol is carried out will depend upon the reaction conditions, as, for example, the acid used for the cleavage, etc. With strong acids a temperature of from about 20° C. to about 70° C. is sufficient but with a very weak acid, much higher temperatures may be required. In general, a temperature of from about 0° C. to about 100° C., and preferably from about 20° C. to about 75° C., is used.

The ketophenol is most easily extracted from the acid-treated reaction mixture by differential extraction with alkali bicarbonate and alkali hydroxide, the alkali-soluble fraction containing the ketophenol. These esters of octahydro - 7 - hydroxy - 1,4a - dimethyl - 9 - oxo - 1 - phenanthrenecarboxylic acid may be purified by recrystallization from aqueous acetic acid, aqueous acetone, aqueous dioxane, or aqueous alcohols.

Proof that the new compounds of this invention have the structure set forth above is found in the fact that on acid treatment of the oxidized ester of 9-oxodehydroabietic acid, acetone is formed. The acetone was isolated and identified as the 2,4-dinitrophenylhydrazone. Acetone could not be formed unless a tertiary hydroperoxide of the type

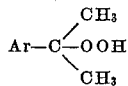

where Ar stands for an aromatic nucleus, were present and the only possibility for a tertiary hydroperoxide of this type is on the isopropyl radical attached to the 7-position of the dehydroabietic nucleus. Since acetone is evolved on treatment with an acid catalyst, then a hydroxyl radical must replace the hydroperoxy-isopropyl group. That this was the case was shown by the fact that this ketophenol gives a positive test with ferric chloride solution and forms a 2,4-dinitrophenylhydrazone showing the presence of both phenol and carbonyl groups. Its ultraviolet absorption spectrum is typical of a phenol in which a carbonyl group is situated in a conjugate position with respect to the benzenoid nucleus. Thus, the new ketophenols of this invention are octahydro-7-hydroxy - 1,4a - dimethyl - 9 - oxo - 1 - phenanthrene carboxylic acid and esters thereof.

The new products of this invention have a wide variety of useful applications. They may be used as antioxidants to prevent the heat degradation of cellulose ethers such as ethyl cellulose and similar compounds. They are also valuable as intermediates in the synthesis of pharmaceuticals, dyestuffs, resins, etc. Dyes which are substantive to wool may be prepared in a wide variety of shades by coupling these new products with diazo bases such as the diazonium salts of sulfanilic acid, p-nitroaniline, benzidine, etc. For example, a light, brilliant red dyestuff is obtained when octahydro - 7 - hydroxy - 1,4a - dimethyl - 9 - oxo - 1 - phenanthrenecarboxylic acid is coupled with diazotized sulfanilic acid, the coupling taking place in the positions ortho to the phenolic hydroxyl, i. e., the 6- or 8- positions. Dyes may also be prepared from octahydro- 7 - hydroxy - 1,4a - dimethyl - 9 - oxo - 1 - phenanthrenecarboxylic acid or its esters by nitration, reduction of the nitro group followed by diazotization and coupling of the new diazo base so obtained with the usual coupling agents, as, for example, R-acid, β-naphthol, etc. Thermosetting resins of the phenolformaldehyde type may be prepared by reacting the new products of this invention with formaldehyde, the linking probably taking place between the 6- or 8-position of one molecule with the 8- or 6-position of another, etc. Since the polymers so formed contain carboxyl groups as an integral portion of their structure, they may be employed both as thermosetting resins and as ion exchange resins. Many other uses for the new products of this invention will be apparent to one skilled in the art.

This application is a continuation-in-part of my application Serial No. 225,284, filed May 8, 1951, now abandoned.

What I claim and desire to protect by Letters Patent is:

1. As a new composition of matter, a compound selected from the group consisting of 1,2,3,4,4a,9,10,10a-octahydro - 7 - hydroxy - 1,4a - dimethyl - 9 - oxo - 1 - phenanthrenecarboxylic acid and 1 - carboalkoxy - 1,2,3, - 4,4a,9,10,10a - octahydro - 7 - hydroxy - 1,4a - dimethyl - 9 - oxophenanthrenes.

2.—A 1 - carboalkoxy - 1,2,3,4,4a,9,10,10a - octahydro - 7 - hydroxy - 1,4a - dimethyl - 9 - oxophenanthrene.

3. 1 - carbomethoxy - 1,2,3,4,4a,9,10,10a - octahydro - 7 - hydroxy - 1,4a - dimethyl - 9 - oxophenanthrene.

4. 1,2,3,4,4a,9,10,10a - octahydro - 7 - hydroxy - 1,4a - dimethyl - 9 - oxo - 1 - phenanthrenecarboxylic acid.

5. The process of preparing alkyl esters of 1,2,3,4,4a,- 9,10,10a - octahydro - 7 - hydroxy - 1,4a - dimethyl - 9 - oxo - 1 - phenanthrenecarboxylic acid which comprises contacting an alkyl ester of 14 - hydroperoxy - 9 - oxodehydroabietic acid with a strongly acid catalyst at a temperature of from about 0 C. to about 100° C.

6. The process of preparing the methyl ester of 1,2,3,4,- 4a,9,10,10a - octahydro - 7 - hydroxy - 1,4a - dimethyl - 9 - oxo - 1 - phenanthrenecarboxylic acid which comprises contacting the methyl ester of 14 - hydroperoxy - 9 - oxodehydroabietic acid with a strongly acid catalyst at a temperature of from about 0° C. to about 100° C.

7. The process of preparing the methyl ester of 1,2,3,4,- 4a,9,10,10a - octahydro - 7 - hydroxy - 1,4a - dimethyl - 9 - oxo - 1 - phenanthrenecarboxylic acid which comprises contacting the methyl ester of 14 - hydroperoxy - 9 - oxodehydroabietic acid with an arylsulfonic acid at a temperature of from about 20° C. to about 75° C.

8. The process of preparing the methyl ester of 1,2,3,4,- 4a,9,10,10a - octahydro - 7 - hydroxy - 1,4a - dimethyl - 9 - oxo - 1 - phenanthrenecarboxylic acid which comprises contacting the methyl ester of 14 - hydroperoxy - 9 - oxodehydroabietic acid with a mixture of glacial acetic acid and perchloric acid at a temperature of from about 20° C. to about 75° C.

References Cited in the file of this patent
UNITED STATES PATENTS

| 2,434,643 | Drake | Jan. 20, 1948 |
| 2,599,471 | Miescher | June 3, 1952 |
| 2,656,343 | Ritchie | Oct. 20, 1953 |

OTHER REFERENCES

Kharasch et al.: J. Org. Chem., 15, 748–9 (1950).